B. F. NEELY.
Clod Fender and Cultivator.
No. 102,959.                    Patented May 10, 1870.
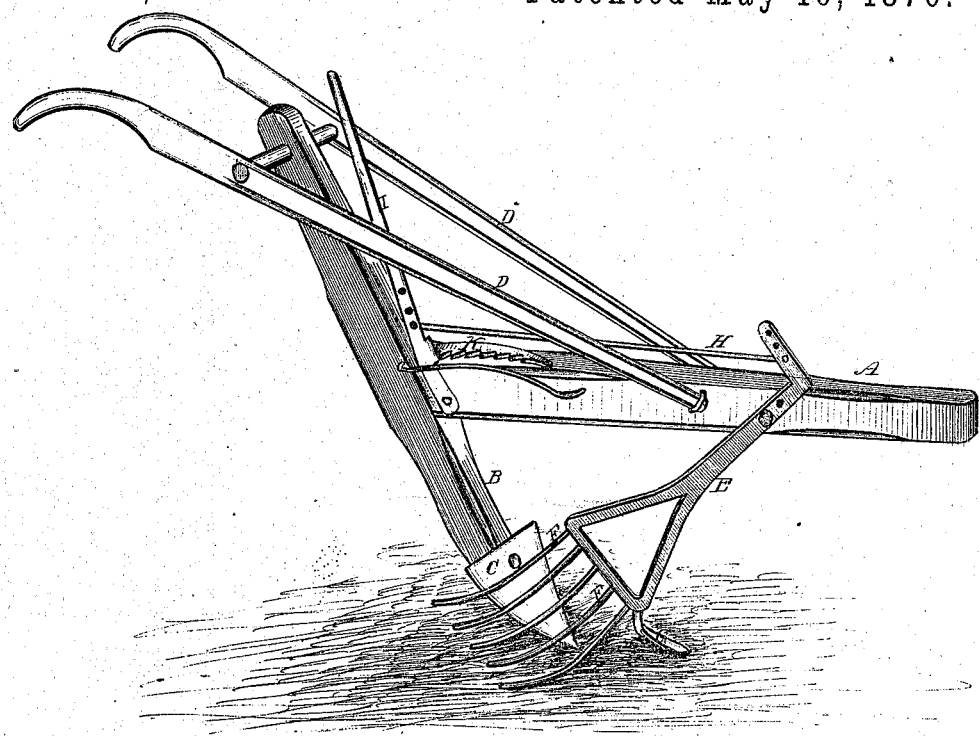

UNITED STATES PATENT OFFICE.

BENJAMIN F. NEELY, OF DALEVILLE, INDIANA.

IMPROVEMENT IN CLOD-FENDER AND CULTIVATOR COMBINED.

Specification forming part of Letters Patent No. 102,959, dated May 10, 1870.

*To all whom it may concern:*

Be it known that I, BENJAMIN F. NEELY, of Daleville, in the county of Delaware and State of Indiana, have invented certain Improvements in Clod-Fender and Cultivator Combined; and I do hereby declare that the following is a full, clear, and exact description thereof, reference being had to the annexed drawings, making part of this specification, in which the figure shown is a perspective view, showing a plow having an adjustable clod-fender attached thereto, such fender being provided with a shovel or scraper upon its front edge.

It is well known that in many sections of the country the earth becomes hard about the time when it becomes necessary to cultivate corn and other crops, and that as a consequence clods or lumps of earth are thrown upon the young plants, which often break and destroy them by being thrown upon them by the ordinary cultivator.

The object of this invention is to provide a remedy for this evil; and to this end it consists in providing such plows or cultivators with an adjustable fender so arranged that its position may be controlled by the operator while the plow is either in motion or in a state of rest.

A in the drawings refers to the beam, B to the helve or standard, C to the shovel, and D D to the handles, of a plow, which may be of any approved construction adapted to the purpose for which it is intended.

E refers to a lever, which is pivoted to the beam of the plow, it having a series of holes through it, so that it may be raised or lowered with reference to such beam. The upper end of this lever is bent upward, as shown in the drawing, and is perforated, so as to enable it to receive the end of a rod, by which it may be turned upon its pivot. The lower end of this lever is to be of the form shown, or of any other that will fit it to receive the teeth F F, which are to be rods of iron secured or riveted onto such lever and extending backward and downward past the shovel of the plow, so that any clods thrown or carried in the direction of the growing crop by such shovel shall be arrested in their movement before they fall upon such crop. The number of these rods will be controlled by the size of the plow to which the fender is attached, they being far enough apart to allow the fine earth to pass between them.

G refers to a shovel, which is attached to the front edge of the lever E at its lower end, its office being to loosen the earth near the rows or hills of the corn or other crop, and to remove any clods which may be pressing against such crop, and thus prepare a place for the fresh earth turned up by the larger shovel.

H refers to a rod, which extends from the upper end of lever E to the lever I, it being connected to each in such a way as to be readily adjustable therein.

I refers to a lever, which at its lower end is pivoted to the beam of the plow, from which point it extends upward between the handles of the plow far enough to be readily accessible to the operator. Upon the front edge of this lever there is formed a beveled projection to engage the notches formed upon the edge of a bar, K, which is secured to the beam of the plow. By carrying the upper end of this lever to the rear the lower end of the fender will be lowered, and by carrying it forward said lower end will be raised, and thus it be caused to assume any desired position with reference to the surface of the earth, it being held in any of its various positions by the notched bar K.

Having thus described my invention, what I claim, and desire to secure by Letters Patent, is—

The combination and arrangement of the fender E F, shovel G, connecting-rod H, hand-lever I, and rack K, substantially as set forth.

In testimony whereof I have signed my name to this specification in the presence of two subscribing witnesses.

B. F. NEELY.

Witnesses:
J. RADER,
M. FINNSICK.